Oct. 25, 1949.   E. V. BUNTING   2,486,257
TRACTOR HITCH AND DIFFERENTIAL HOUSING
Filed Nov. 2, 1945
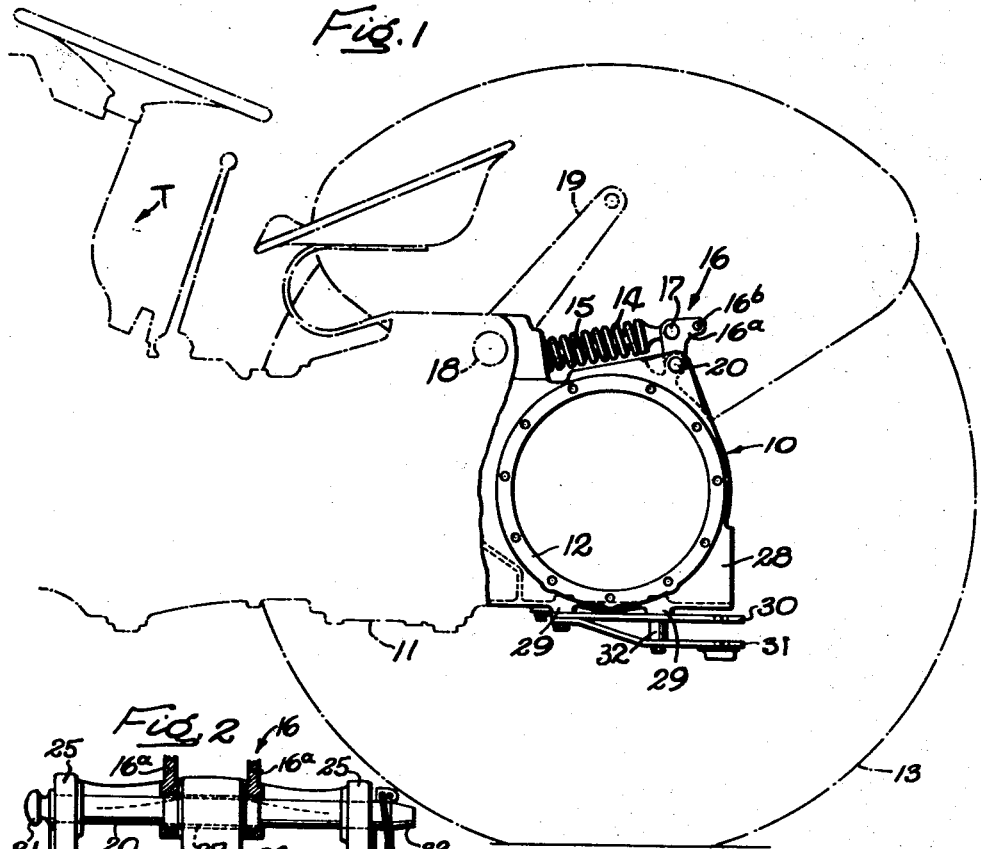
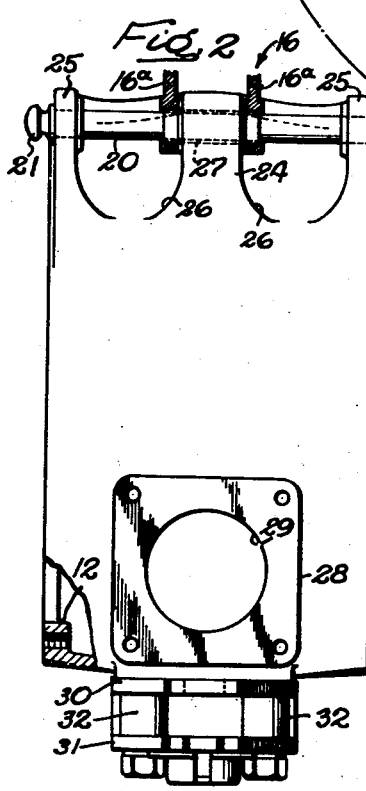
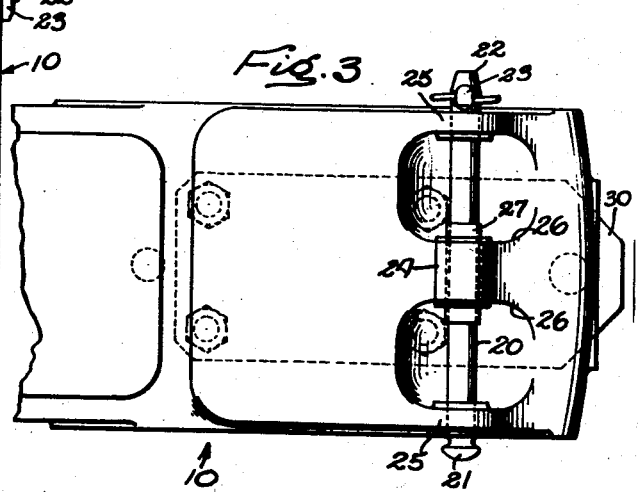
INVENTOR
Ernest V. Bunting
ATTORNEYS Patented Oct. 25, 1949

2,486,257

UNITED STATES PATENT OFFICE 2,486,257

TRACTOR HITCH AND DIFFERENTIAL HOUSING

Ernest V. Bunting, Dearborn, Mich., assignor to Harry Ferguson, Inc., Detroit, Mich., a corporation of Delaware Application November 2, 1945, Serial No. 626,395

4 Claims. (Cl. 280—33.44)

The present invention pertains to differential housings for tractors, and more particularly to those especially suited for agricultural tractors.

The general aim of the present invention is to simplify the attachment of implements and control devices to such a housing and to enlarge the variety of attachments which are accommodated.

More particularly, it is an object of the invention to provide a differential housing embodying a novel arrangement on its upper portion for the optional connection of an element of a hitch or the like either to a readily uncoupled pivot or to an element of an automatic draft control device such, for example, as that commonly employed in the Ferguson system on the familiar Ford lightweight agricultural tractor.

Even more particularly, it is an object of the invention to provide a tractor differential housing equipped with a readily removable pin for coupling-on an element of a hitch or the like and which pin also serves, when in place, to aid in supporting a rockable draft control element, but with the latter preferably so arranged that it remains operative and in place even upon removal of the pin.

Further objects and advantages of the invention will become apparent as the following description proceeds, taken in connection with the accompanying drawings in which:

Figure 1 is a side elevation of a tractor differential housing embodying the present invention, the adjacent portions of the tractor being outlined simply in broken lines and the rear axle housing and rear wheel nearest the observer being removed.

Fig. 2 is an enlarged rear elevation of the differential housing appearing in Fig. 1.

Fig. 3 is an enlarged fragmentary plan view of the differential housing appearing in Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated, the invention has been shown as embodied in a differential housing designated generally as 10 for a tractor T. Such housing is generally cylindrical or drum-shaped and constitutes the rear end portion of a transmission casing indicated at 11 in broken lines. To flanges 12 bordering openings at opposite sides of the differential housing may be bolted suitable rear axle housings (not shown) for the axles of the tractor's rear wheels 13. It is with the external features of the differential housing that the present invention is primarily concerned, and accordingly no further attention need be given to its general body or internal arrangement. Of course the usual differential (not shown) is normally received within the housing 10.

Above the differential housing 10 is shown a compression spring 14 encircling a plunger 15 pivoted at its outer end to a shackle designated generally as 16. This shackle comprises a spaced pair of members 16a of bell crank or L-shaped form joined by a pivot pin 17 to which the plunger 15 is connected. The shackle 16, plunger 15 and spring 14 form part of an automatic draft control mechanism such as is commonly employed in the Ferguson system. For the moment suffice it to note that upon application of a force tending to rock the shackle 16 forward, the spring 14 is compressed and the plunger 15 thrust forward. This movement of the plunger is used in controlling the supply of pressure fluid for a hydraulic ram (not shown) that turns a rockshaft 18 to which are connected crank arms such as 19 for raising or lowering an implement. For detail of such an arrangement reference may be made to Henry George Ferguson Patent No. 2,118,180 issued May 24, 1938.

Provision is made herein for simplifying the optional coupling-on of either (1) a pressure applying link or the like for rocking the control shackle 16, or (2) a simple draft link or the like at the upper portion of the differential housing which is not intended to affect the automatic draft control mechanism.

In the present instance such coupling arrangement includes a heavy transverse coupling pin 20 having a head 21 at one end and a tapered nose 22 at the other. A transverse linchpin 23 serves to prevent inadvertent removal of the coupling pin 20.

The coupling pin 20 is inserted through registering holes in a central boss 24 and a pair of flanking lugs 25. The boss and lugs are fashioned integrally with the upper rear portion of the cast differential housing 10. In the spaces between the boss 24 and respective ones of the lugs 25 the surface of the differential housing is recessed as indicated at 26 so as to afford substantial clearance about the portions of the coupling pin 20 which are exposed in these spaces.

If desired, a bushing 27 may be fixed in the transverse hole in the central boss 24 and dimensioned to protrude laterally from opposite sides of the boss a sufficient distance that the side members 16a of the shackle 16 may be journaled on the protruding portions of the bushing. When the coupling pin 20 is in place it reenforces the bushing 27, precluding the possibility of shearing of the same even when a heavy forward thrust is applied to the shackle 16. On the other hand, the shackle remains properly in place when the coupling pin 20 is removed for any purpose. Sufficient lengths of the coupling pin 20 are exposed between the ends of the bushing 27 and opposed inner faces of the lugs 25 that the yoke-shaped end of a draft link or the like (not shown) may be readily pivoted on such portions of the coupling pin when desired.

Protruding from the lower rear side of the differential housing 10 is an integral enlargement 28 having in it a bore 29 through which projects the usual power take-off shaft (not shown). To pads 29 beneath the differential housing is bolted a suitable clevis located beneath the enlargement 28 and which may constitute a second point of draft application when desired. This second point of attachment is of course located well below the center of the rear axle of the tractor rather than above the same as in the case of the coupling pin 20. In the present instance the clevis mentioned above comprises upper and lower plates 30, 31 held apart by spacers 32. A suitable pivot pin (not shown) such, for example, as that described and claimed in my copending application Serial No. 622,125, filed October 13, 1945, may be used for attaching a draft link or the like to the clevis 30, 31.

In operation the user may readily attach or detach an implement or the like to or from the differential housing 10. If it happens to be an implement requiring automatic draft control, the coupling pin 20 is simply left in place and a compression link or the like from the implement is connected to the shackle 16 by a pin passed through holes 16b. In such case the shackle 16 is free to rock fore and aft about the bushing 27 reenforced by the pin 20. On the other hand, if services of the automatic draft control are not required, the pin 20 may be removed and then re-inserted through the holes in the boss 24 and lugs 25, as well as through registering holes in the forward end of a compression or supporting element or the like (not shown) so that the latter is pivoted on the exposed portions of the pin 20 lying between the central boss and flanking lugs. The pin 20 is so firmly supported in the boss and lugs that a very heavy load may be applied to it by a compression or supporting element.

From the foregoing it will be perceived that a simple and extremely rugged form of differential housing has been provided. Insertion or removal of the coupling pin 20 for attaching and detaching various implements is but the work of a moment. Moreover, the arrangement is thoroughly safe in that even if the user neglects to re-insert the pin 20 when attaching a draft-controlled implement, the shackle 16 will still be properly mounted, and moreover it will remain properly mounted even if the pin 20 should become dislodged during use.

I claim as my invention:

1. A tractor differential housing having on its upper portion a boss flanked by a pair of lugs laterally spaced therefrom, said boss and lugs having registering holes therein arranged in horizontal alignment transversely of said housing, a bushing in said hole in said boss protruding laterally therefrom toward each of said lugs but spaced from the latter, a shackle having leg portions journaled on the protruding portions of said bushing to rock fore and aft of said housing, and a coupling pin removably inserted through said registering holes, the portions of said pin exposed between said lugs and the ends of said bushing being adapted to receive the legs of a connecting yoke or the like.

2. A tractor differential housing having a hydraulic control element thereon and having on its upper portion a boss flanked by a pair of lugs laterally spaced therefrom, said boss and lugs having registering holes therein arranged in horizontal alinement transversely of said housing, a coupling pin removably inserted through said registering holes, the portions of said pin exposed between said lugs and the ends of said boss being adapted to receive the ends of hitch links or the like, a draft connection on the lower portion of said tractor differential at a point spaced generally vertically beneath said pin, and means on said boss for the pivotal mounting of a detachable shackle, said latter named means allowing fore and aft rocking movement of said shackle for effecting positioning of the hydraulic control element.

3. A tractor differential housing having on its upper portion a boss flanked by a pair of lugs laterally spaced therefrom and all integral with said housing to define a pair of rearwardly facing recesses, said boss and lugs having alined transverse holes therein, and a coupling pin removably inserted through said holes and of sufficient length to extend through both lugs with its central portion in said boss and thereby to bridge said recesses, portions of said pin between said boss and lug being exposed to pivotally engage the ends of a pair of hitch links or the like, said boss and lugs serving both to limit the lateral movement of the engaged hitch links in each direction and to reinforce said pin against any stresses exerted thereon by such hitch links.

4. A tractor differential housing having a hydraulic control element thereon and having on its upper portion a boss flanked by a pair of lugs laterally spaced therefrom, said boss and lugs having registering holes therein arranged in horizontal alinement transversely of said housing, a coupling pin removably inserted through said registering holes, the portions of pin exposed between said lugs and the ends of said bushing being adapted to receive the ends of hitch links or the like, a draft connection at the lower portion of said tractor differential at a point spaced generally vertically beneath said pin, and a shackle pivoted adjacent said boss and supported thereby for fore and aft swinging movement about said pin for positioning said hydraulic control element.

ERNEST V. BUNTING.

REFERENCES CITED

The following references are of record in the file of this patent:

UNITED STATES PATENTS

| Number | Name | Date |
| --- | --- | --- |
| 1,775,268 | Baldwin | Sept. 9, 1930 |